Aug. 15, 1950     L. E. MOREE ET AL     2,518,562
KNIFE FOR MEAT TENDERIZING MACHINES
Filed June 22, 1946     2 Sheets-Sheet 1
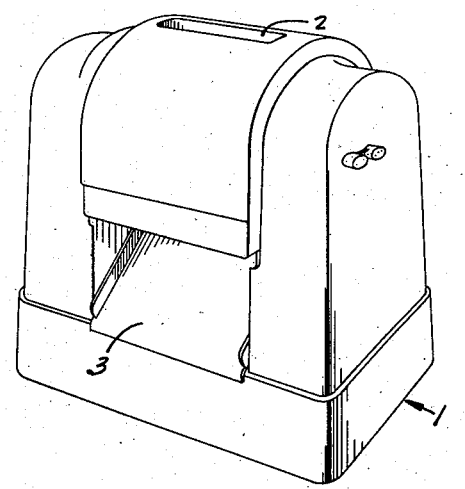
Fig. I
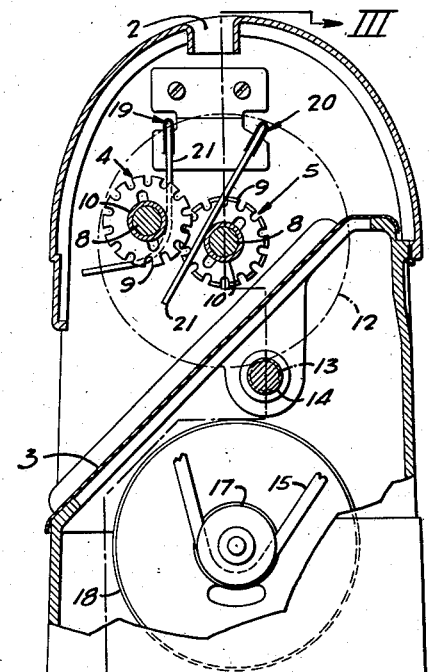
Fig. II
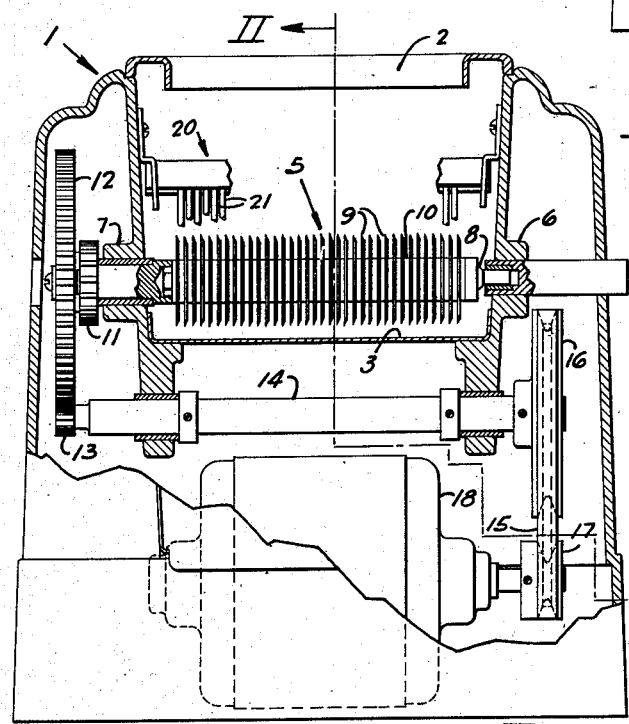
Fig. III
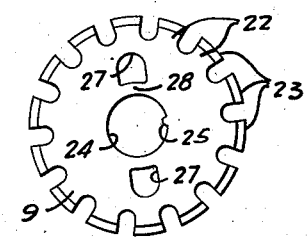
Fig. IV
INVENTORS
Leland E. Moree
Henry K. Leonard
BY Marshall and Marshall
ATTORNEYS Aug. 15, 1950  L. E. MOREE ET AL  2,518,562
KNIFE FOR MEAT TENDERIZING MACHINES
Filed June 22, 1946  2 Sheets-Sheet 2
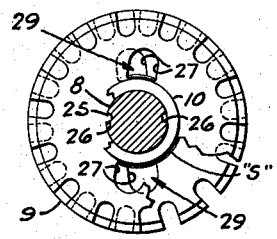
Fig. VI
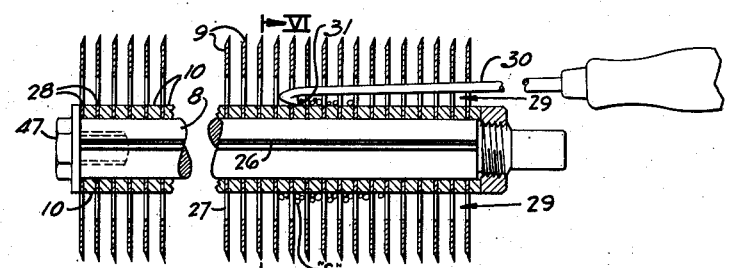
Fig. V
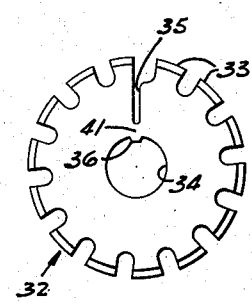
Fig. VII
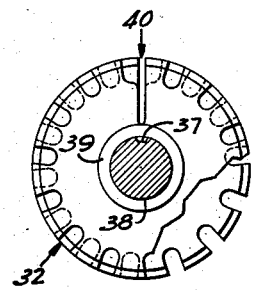
Fig. IX
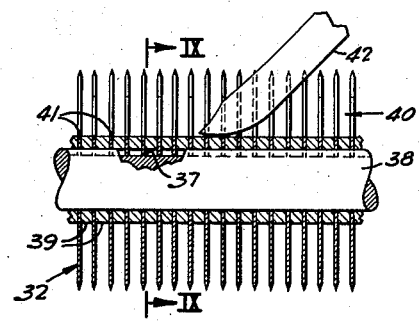
Fig. VIII
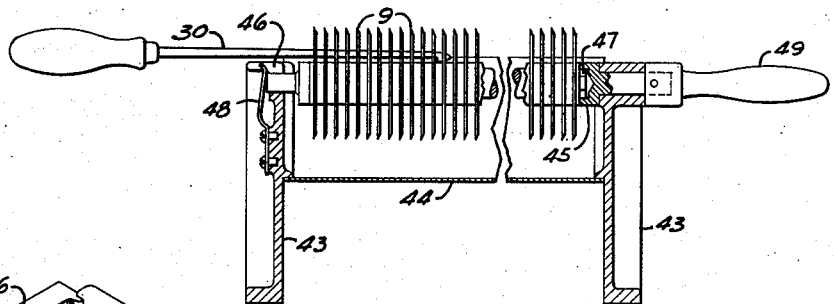
Fig. XI
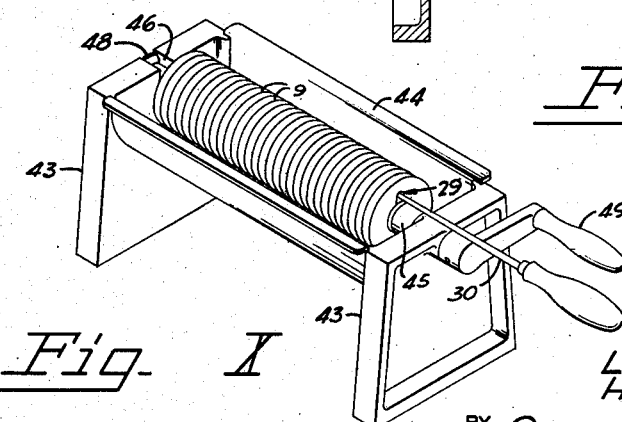
Fig. X
INVENTORS
Leland E. Moree
Henry K. Leonard
BY Marshall and Marshall
ATTORNEYS Patented Aug. 15, 1950

2,518,562

UNITED STATES PATENT OFFICE 2,518,562

KNIFE FOR MEAT TENDERIZING MACHINES

Leland E. Moree and Henry K. Leonard, Toledo, Ohio, assignors to Toledo Scale Company, Toledo, Ohio, a corporation of New Jersey Application June 22, 1946, Serial No. 678,696

6 Claims. (Cl. 17—26)

This invention relates to machines which are employed for the purpose of tenderizing steaks and more particularly to the knives which are used in such machines.

Steak tenderizing machines are employed in markets and restaurants and other meat sales or serving organizations for the purpose of treating pieces of meat to render them more tender and thus, to enable the preparation of palatable tasty steaks from pieces of meat which unless treated would be too sinewous for use as steaks. These pieces of meat are taken from other than the most desirable portions of the carcass and generally contain a considerable quantity of muscle sheaths, tendons, sinews and other tough and stringy cartilage. The purpose of the tenderizing operation is to tenderize these tough members with a multiplicity of short cuts. This purpose usually is accomplished by passing the meat to be tenderized between a pair of parallel shafts or arbors on each of which is mounted a plurality of disk-like sharp edged knives. These knives often have toothed edges and may be staggered with relation to each other or may be assembled alternately with continuous edge knives or in other combination of various types of knives.

When the meat passes between these sets of knives the edges of the teeth hook the tendons and muscle sheaths which, although often very thin, are extremely tough and elastic. Thus, these sinewous members often times are withdrawn from the meat by the action of the knives and wrapped tightly around the knives. Many times lengthy tendons are entirely withdrawn from the meat and are wrapped tightly around the arbors between the knives. All in all in the course of an average working day a considerable quantity of this tough stringy substance will be withdrawn from the many pieces of meat tenderized in the machine and will lodge between the knives tightly wrapped around the arbors on which the knives are mounted.

The removal of this tough and stringy material presents a considerable problem not only because of its toughness but because of the fact that the knife rolls must be held in some manner and the edges of the knives are so sharp that if held in the hand they are likely to pierce the skin. Also, since the operator must insert some kind of an instrument between the knives, working from the outside toward the center, the direction of any cut which he can make is parallel to the direction in which the tendons are wrapped around the arbor and it is, therefore, difficult to sever the tendons. Often times it is necessary to catch one end of a long tendon and then taking the end in the fingers to unwind it from around the arbor.

It is an object of this invention to provide knives for a meat tenderizing machine which can quickly and easily be cleaned of sinews or tendons which wrap around the arbor between the individual knife blades.

It is another object of this invention to provide a knife for use in a tenderizing machine which permits the sinewous material wrapped around the arbor between the knife blades to be served so that it can easily be washed or brushed from between the knives.

It is a further object of this invention to provide a disk-like knife for a tenderizing machine which will permit a knife stroke to be made at right angles to the direction in which sinews or tendons may be wrapped around the arbor on which the knives are mounted thus permitting them to be completely severed for easy removal from between the knives.

This invention consists in a disk-like cutting knife having an aperture therethrough in a direction parallel to the shaft or arbor on which the knives are mounted in gangs for use in a tenderizing machine.

In the drawings:

Figure I is a perspective view of the exterior of a tenderizing machine of the general type employing knives embodying the instant invention.

Figure II is a vertical sectional view on an enlarged scale through the machine shown in Figure I and taken along the line II—II of Figure III.

Figure III is a fragmentary vertical sectional view of the machine shown in Figure I with the front cover broken away and taken along the section line III—III of Figure II.

Figure IV is a view in elevation of one of the knife blades embodying the instant invention.

Figure V is a fragmentary vertical sectional view taken substantially on the center line of a knife arbor mounting a gang of knives embodying the instant invention.

Figure VI is a vertical sectional view taken substantially on the line VI—VI of Figure V.

Figure VII is a view similar to Figure IV but of a modification of the instant invention.

Figure VIII is a fragmentary view similar to Figure V but of an arbor carrying knives of the type shown in Figure VII.

Figure IX is a vertical sectional view taken substantially on the line IX—IX of Figure VIII.

Figure X is an isometric view of a knife arbor cleaning trough as employed in cleaning a tenderizing machine arbor carrying knives embodying the instant invention.

Figure XI is a vertical sectional view of the mechanism shown in Figure X.

A tenderizing machine of the type employing parallel arbors mounting disk-shaped tenderizing knives may comprise a housing 1 having a feeding chute 2 in its upper portion and a discharge chute 3 in its lower portion. A pair of knife rolls 4 and 5 are journaled within the housing 1 in frame members 6 and 7. The knife rolls 4 and 5 consist of arbors 8 on which are mounted a plurality of disk-like cutting knives 9 alternated with washer-like spacers 10. The two knife rolls 4 and 5 are parallel and so located that the peripheries of the two gangs of knives 9 overlap (see Figure II). The knife rolls 4 and 5 are driven by intermeshing spur gears 11 which in turn are driven by a gear 12 engaged by a pinion 13 secured on the end of a countershaft 14. The countershaft 14 also is journaled on the frame members 6 and 7 and is driven by a belt 15 which engages its pulley 16 and a pulley 17 pinned on the shaft of a motor 18 which is located within the housing 1. A pair of guides 19 and 20 are mounted within the housing 1 beneath the feeding chute 2 with their fingers 21 extending between adjacent ones of the disk-like knives 9 and forming a chute which carries the meat being tenderized through and between the knife rolls 4 and 5 so that it falls onto the discharge chute 3 and exits from the machine.

Figure IV illustrates a knife 9 which is disk-like in shape and the periphery of which is composed of a series of arcuate teeth 22 having sharpened peripheral edges 23 which cut the meat with a series of short cuts. A hole 24 is punched at the center of the knife 9 so that it can be mounted on the arbor 8 (see also Figure V). A tooth-like key 25 extends into the hole 24 for engagement with one of a pair of keyways 26 which are cut longitudinally in the arbor 8. The keyways 26 extend parallel to the center line of the arbor 8 and are located at slightly less than 180° from each other. The knives 9 are assembled on the arbor 8 alternately with the washer-like spacers 10 and the knives themselves are assembled on the arbor 8 with their keys 25 being placed alternately in the two keyways 26 so that the teeth 22 of adjacent knives 9 are staggered with respect to each other (see Figure VI).

A pair of apertures 27 are cut through each of the knives 9 being located 180° apart and with a small web 28 of the knife body left between the innermost edge of each of the apertures 27 and the edge of the center hole 24. This web 28 is of the same thickness radially as are the spacers 10. Two apertures 27 are cut in each of the knives 9 so that when the knives are assembled on the arbor 8, with each successive knife turned almost 180° with respect to its neighbors, the apertures 27 will fall almost into line. The apertures are of sufficient width arcuately so that they will overlap sufficiently to form passageways 29 extending through all of the knives 9 mounted on the arbor 8 parallel to the center line of the arbor 8.

The passageway 29 exposes to view sinews or tendons (for example those indicated by the letter S in Figures V and VI) which may have become wrapped around the spacers 10 between the knives 9. There is provided a cutting hook 30 which has a short sharp edge 31 and is insertable from either end of the passageway 29 to hook the tendons or sinews S and when withdrawn to sever them. The hook 30 passes over the sinewous material when inserted and when withdrawn slides along the outer surface of the spacers 10 and the web 28 hooking all of the material wrapped around the spacers 10 and severing it completely. It remains between the knives only in short C-shaped pieces which, by virtue of the elasticity of the sinewous material, immediately shorten in length and start to unwrap themselves from about the spacers 10 so that they can be removed from between the knives 9 with a long fiber brush or merely by the force of water if held beneath a faucet.

There is shown in Figures VII, VIII and IX a modification of the invention. In these figures a knife 32 having teeth 33 and a center hole 34 is equipped with a radially extending slot 35 which lies along an edge of one of the teeth 33 and on the same radius as the center line of a key 36 extending into the center hole 34. The keys 36 of a series of knives 32 are engaged in a keyway 37 which is cut in a knife arbor 38. The knives 32 are mounted on the knife arbor 38 alternately with washer-like spacers 39 and the knives 32 themselves are alternately reversed on the arbor 38 so that the teeth 33 of the knives 32 are staggered with relation to each other and the slots 35 in the knives 32 form a continuous passageway 40 through the knives 32 in a direction parallel to the center line of the arbor 38. At the inner end of each of the slots 35 there is left a web 41 which is radially of the same thickness as the radial thickness of the spacers 39.

In this embodiment of the invention such sinewous material as may wrap around the spacers 39 between the knives 32 can be severed by inserting a knife blade 42 into the passageway 40 and drawing it along this passageway the full length of the arbor 38. This permits the tendons to be severed in a manner similar to that in which they are cut by the hook 30 employed with the modification of the invention shown in Figures IV, V and VI.

In Figures X and XI there is shown a cleaning trough which comprises a pair of vertically extending legs 43 between which there is mounted a semicylindrical trough 44 and which has a manually rotatable socket 45 journaled in one of the legs 43 and a slot 46 cut in the upper portion of the other one of the legs 43. The socket 45 is adapted to engage a hex-head stud 47 (see Figure V) which is threaded into the end of the arbor 8 to retain the spacers 10 and knives 9 thereon. The other end of the arbor 8 fits into the slot 46 and is retained therein by a resilient clip 48. A handle 49 on the socket 45 enables the socket and the arbor mounted therein to be rotated. The trough 44 is designed to contain either hot water or other cleansing solution.

When an arbor carrying knives embodying the instant invention is mounted in a cleaning trough of this type the arbor can be held stationary by the handle 49 and the hook 30 inserted into the passageway 29 to sever the sinewous material wrapped around the arbor which is softened by the solution contained in the trough 44 and can easily be brushed from between the knives 9 into the trough 44.

The embodiments of the invention which have been described may be modified to meet various requirements.

Having described the invention, we claim:

1. A knife roll for a meat tenderizing machine comprising, in combination, an arbor and a plurality of substantially disk-shaped cutting knives mounted on said arbor, each of said knives having an aperture cut through its body, said apertures having a radial extent not greater than any portion of the edges of said knives and being substantially in line to form a passageway through said knives parallel to the axis of said arbor.

2. A knife roll for a meat tenderizing machine comprising, in combination, an arbor, a plurality of substantially disk-shaped cutting knives mounted on said arbor and a plurality of annular spacers mounted between said knives, said knives having apertures through their bodies each with an inner edge having a radius substantially identical with the outer radius of said spacers and an outer edge having a radius not greater than the radius of any part of the edges of said knives, the apertures being substantially in line to form a passageway through said knives parallel to the axis of said arbor whereby any material wrapped around said spacers between said knives is exposed to view and to reach through said passageway.

3. A knife roll for a meat tenderizing machine comprising a shaft, a plurality of substantially disk-shaped knives and a plurality of spacing washers having substantially cylindrical peripheries, said knives and said washers being alternately assembled on said shaft, said washers having lesser diameters than any portions of the edges of said knives, said knives having apertures through their bodies with inner edges in line with the peripheries of said washers, the apertures being substantially in line to form a passageway.

4. A knife for the meat tenderizing assembly of a machine having a shaft adapted to mount a plurality of alternate knives and cylindrical washer-like spacers that is characterized by an aperture cut through the body of the knife, the radius of the inner edge of the aperture being substantially equal to the radius of the outer edge of the spacers, no part of the aperture being at a point farther from the center of the shaft than the minimum diameter of any part of the edge of the knife.

5. A knife for the meat tenderizing assembly of a machine having a shaft adapted to mount a plurality of alternate knives and cylindrical washer-like spacers, said knife having a toothed, scallop-like periphery, that is characterized by an aperture cut through the body of the knife, the radius of the inner edge of the aperture being substantially equal to the radius of the outer edge of the spacers, no part of the aperture being at a point farther from the center of the shaft than the minimum diameter of any part of the edge of the knife.

6. A knife for the meat tenderizing assembly of a machine having a shaft adapted to mount a plurality of alternate knives and cylindrical washer-like spacers, said knife having a toothed, scallop-like periphery, that is characterized by an aperture cut through the body of the knife, the radius of the inner edge of the aperture being substantially equal to the radius of the outer edge of the spacers, no part of the aperture being at a point farther from the center of the shaft than the minimum diameter of any part of the edge of the knife, the aperture being of such size and location relative to a tooth in the edge of the knife that when adjacent knives are rotated relative to each other through an angle equal to approximately half of the angle subtended by a tooth and a space between adjacent teeth, the apertures remain substantially in line forming a passageway extending unobstructed the full length of the assembled knives and spacers.

LELAND E. MOREE.
HENRY K. LEONARD.

REFERENCES CITED

The following references are of record in the file of this patent:

UNITED STATES PATENTS

| Number | Name | Date |
| --- | --- | --- |
| 133,270 | Taylor | Nov. 19, 1872 |
| 252,743 | Davis | Jan. 24, 1882 |
| 1,428,308 | Wiard | Sept. 5, 1922 |
| 2,025,505 | Gonser | Dec. 24, 1935 |
| 2,420,549 | McKee et al. | May 13, 1947 |

FOREIGN PATENTS

| Number | Country | Date |
| --- | --- | --- |
| 123,573 | France | Apr. 1, 1878 |